(12) United States Patent
Pichler et al.

(10) Patent No.: US 11,598,586 B2
(45) Date of Patent: Mar. 7, 2023

(54) HEAT TRANSFER DEVICE

(71) Applicant: Miba Sinter Austria GmbH, Laakirchen (AT)

(72) Inventors: Philipp Pichler, Thalheim bei Wels (AT); Franz-Josef Gielesberger, Ohlsdorf (AT); Raimund Ratzi, Wels (AT); Samuel Wallner, Ligist (AT); Rene Hoesele, Lieboch (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 17/467,606

(22) Filed: Sep. 7, 2021

(65) Prior Publication Data

US 2022/0113093 A1 Apr. 14, 2022

(30) Foreign Application Priority Data

Oct. 9, 2020 (AT) .............................. A 50872/2020

(51) Int. Cl.
| | | |
|---|---|---|
| *F28D 15/04* | (2006.01) | |
| *F28D 15/02* | (2006.01) | |
| *B33Y 80/00* | (2015.01) | |

(52) U.S. Cl.
CPC ....... *F28D 15/046* (2013.01); *F28D 15/0233* (2013.01); *F28D 15/0266* (2013.01); *B33Y 80/00* (2014.12)

(58) Field of Classification Search
CPC ............ F28D 15/0233; F28D 15/0266; F28D 15/046; F28D 1/00; F28D 1/0408; F01K 11/02; F01K 7/38; F01K 23/101; F28F 9/0246; B33Y 80/00
See application file for complete search history.

(56) References Cited

U.S. PATENT DOCUMENTS

| | | | |
|---|---|---|---|
| 4,274,479 A | 6/1981 | Eastman | |
| 6,446,706 B1 | 9/2002 | Rosenfeld et al. | |
| 7,806,168 B2 * | 10/2010 | Upadhya | ............. F28D 15/0266 165/80.4 |
| 9,459,050 B2 * | 10/2016 | Zhao | ...................... F28D 15/046 |
| 10,096,537 B1 * | 10/2018 | Chen | ................... F28D 15/0266 |
| 2004/0211549 A1 * | 10/2004 | Garner | ................. F28D 15/046 431/325 |
| 2005/0022976 A1 | 2/2005 | Rosenfeld et al. | |
| 2007/0240860 A1 | 10/2007 | Meyer, IV et al. | |
| 2008/0210407 A1 | 9/2008 | Kim et al. | |
| 2013/0112376 A1 * | 5/2013 | Zhao | ........................ B22F 3/11 165/104.28 |

(Continued)

FOREIGN PATENT DOCUMENTS

| | | |
|---|---|---|
| AT | 521 573 A1 | 3/2020 |
| CN | 107401941 A | 11/2017 |

(Continued)

*Primary Examiner* — Shafiq Mian
(74) *Attorney, Agent, or Firm* — Collard & Roe, P.C.

(57) ABSTRACT

A heat transfer device includes a sleeve, which forms an interior in which a working medium and one vaporization element having structural elements, or multiple vaporization elements having structural elements, for converting at least part of the working medium from the liquid to the gaseous state are contained, wherein the vaporization element or the vaporization elements has or have a porosity, and is or are connected to the sleeve.

9 Claims, 5 Drawing Sheets

(56) References Cited

U.S. PATENT DOCUMENTS

| | | | |
|---|---|---|---|
| 2015/0000881 A1* | 1/2015 | Tamura | F28F 13/187 |
| | | | 165/157 |
| 2017/0363373 A1* | 12/2017 | Cai | F28D 15/046 |
| 2021/0184291 A1 | 6/2021 | Gaigg et al. | |

FOREIGN PATENT DOCUMENTS

| | | |
|---|---|---|
| DE | 10 2008 054 958 A1 | 7/2010 |
| WO | 03/019098 A1 | 3/2003 |

* cited by examiner

HEAT TRANSFER DEVICE

CROSS REFERENCE TO RELATED APPLICATIONS

Applicant claims priority under 35 U.S.C. § 119 of Austrian Application No. A50872/2020 filed Oct. 9, 2020, the disclosure of which is incorporated by reference.

BACKGROUND OF THE INVENTION

1. Field of the Invention

The invention relates to a heat transfer device comprising a sleeve, which forms an interior in which a working medium and one or multiple vaporization element(s) having, in particular knob-shaped, structural elements for converting at least part of the working medium from the liquid to the gaseous state are contained, wherein the vaporization element has a porosity.

The invention further relates to a method for producing a heat transfer device comprising the steps (not obligatorily in the indicated order): providing a sleeve; providing one vaporization element or multiple vaporization elements having, in particular knob-shaped, structural elements; filling a working medium into the sleeve; pressure-tight closing and reduction of the pressure in the interior of the sleeve.

2. Description of the Related Art

It is known from the prior art that so-called heat pipes are used for cooling electronic components.

In simple terms, a heat pipe is a self-contained system in a substantially pipe-shaped or flat housing that has a fluid in its inside that is close to its boiling point at operating temperature due to the prevailing pressure. If the heat pipe is heated in a partial area, the fluid changes to the gaseous phase, to flow in the direction of a cooler area in the interior of the heat pipe, condense there and flow back into the warmer area along the inner walls of the housing of the heat pipe. In the course of this (heat) transfer process, the heat pipe extracts heat from its surroundings in a vaporization area and supplies this heat to the surroundings of the condensation area of the heat pipe.

Such a cooling system is described in DE 10 2008 054 958 A1 from which a temperature control system for controlling the temperature of at least one rechargeable battery of a vehicle with at least one heat transfer device for thermal connection of the battery to at least one heat source and/or heat sink arranged in the vehicle is known. The heat transfer device comprises at least one heat contact zone for releasably thermally contacting the battery and at least one heat pipe for heat transfer.

WO 03/019098 A1 shows a plate-shaped cooling device for cooling electronic components which has a sleeve of a multi-layer film forming an interior in which a working medium and a vaporization element are contained. The vaporization element is designed in the form of a wire-like separator. A mat made of inorganic fibers is arranged between the vaporization element and the sleeve.

US 2007/240860 A1 shows a plate-shaped cooling device for cooling electronic components having a sleeve made of a metallized plastic material and a single-piece vaporization element having structural elements. A mat made of fibers is arranged between the vaporization element and the sleeve.

US 2008/210407 A1 shows a plate-shaped cooling device comprising a sleeve made of two interconnected flexible films, a single-piece vaporization element made of a polymer material for converting the working medium from the liquid to the gaseous state and a mat made of inorganic fibers.

CN 107401941 A shows a plate-shaped cooling device for cooling electronic components. A vaporization element made of metallic foam and a mat made of fibers are arranged in a sleeve.

SUMMARY OF THE INVENTION

The present invention is based on the object of creating an improved heat transfer system, in particular for cooling a component, preferably an electronic component.

The object is achieved by the initially mentioned heat transfer device in which the vaporization element or the vaporization element(s) is/are connected to the sleeve.

The object is further achieved by the initially mentioned method, according to which it is provided that the vaporization element(s) are connected to the sleeve.

In this regard, it is advantageous that by connecting the at least one vaporization element to the sleeve, better heat transfer from the vaporization element onto the sleeve and thus ultimately an improved heat transfer and/or an improved cooling effect may be achieved. Hence, a relatively high heat spread, and a quick heat transfer may be achieved in a small (narrow) space.

According to an embodiment variant of the invention, it may be provided that the vaporization element on its side facing the sleeve comprises a layer with a smaller porosity as compared to the remaining vaporization element. Hence, better connectability of the inherently porous vaporization element may be achieved.

According to another embodiment variant of the invention, it may be provided that for a more homogeneous heat transfer in the vaporization element sections with different porosities are formed.

For further improvement of the cooling effect and/or heat transfer, according to another embodiment variant, it may be provided that at least the, preferably knob-shaped, structural elements of the vaporization element have a porosity between 5% and 70%, whereby a correspondingly large surface for vaporization of the working medium may be provided.

Also for the reason of providing a large surface and thus improving the heat transfer and/or cooling effect, it may be provided according to an embodiment variant of the invention, that at least 15% of the volume of the sleeve are occupied by the vaporization element(s). Apart from that, it may also be provided that a maximum of 70% of the volume of the sleeve are occupied by the vaporization element(s), such that the vapor phase in the heat transfer device still has a correspondingly large volume at its disposal and hence, in turn, the performance of the heat transfer device may be improved.

According to another embodiment variant of the invention, it may also be provided that multiple different vaporization elements are arranged in the sleeve, whereby the heat transfer may be formed in different zones and/or the cooling effect may be formed in different cooling zones, and hence a better adaption to the temperature distribution of the object (to be cooled) may be achieved.

To increase the modularity of the system, in particular thereby also to achieve a system with as many identical parts as possible for different tasks (cooling tasks), it may be provided according to a further embodiment variant of the invention, that the vaporization element(s) are produced having at least one predetermined breaking point.

The desired porosity of the vaporization elements may easily be provided if, according to another embodiment variant of the invention, it is provided that the vaporization element(s) is/are produced powder-metallurgically or by means of 3D printing.

Different porosities may easily be produced in the at least one vaporization element if, according to a further embodiment variant, it is provided that the vaporization element(s) is or are made of a powder comprising particles with a grain size of between 5 μm and 500 μm. For example, the powder may comprise particles with a grain size of between 5 μm and 100 μm and/or particular with a grain size of between 150 μm and 300 μm.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

For the purpose of better understanding of the invention, it will be elucidated in more detail by means of the figures below.

These show in a simplified schematic representation.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Where indications regarding standards are made in the present description, these always refer to the last valid version of these standards at the priority date of the present application if not stated otherwise.

Figure 1:
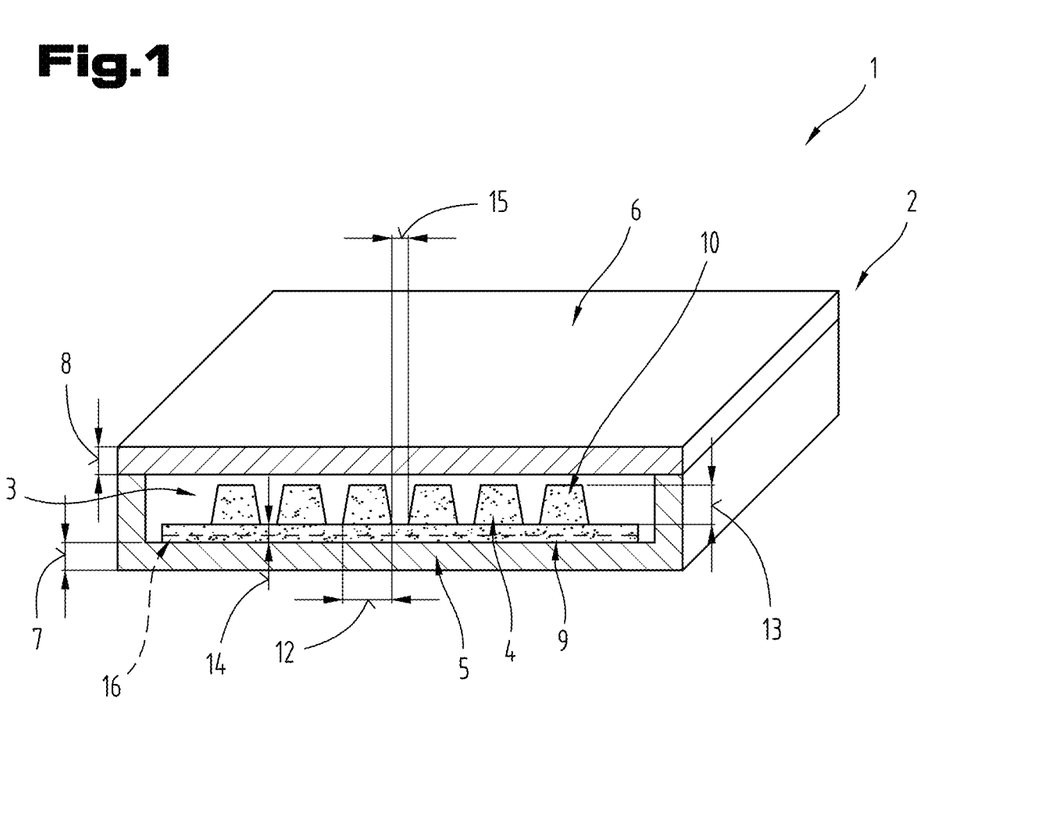
FIG. 1 shows an embodiment variant of a heat transfer device in a sectional oblique view.

FIG. 1 shows a first embodiment variant of a heat transfer device 1, in particular a cooling device, in a sectional oblique view. The heat transfer device 1 comprises a sleeve 2 forming an interior 3. At least one vaporization element 4 is arranged in the interior 3. Moreover, a working medium which is not depicted is contained in the interior 3. The working medium may, for example, be water. However, other liquids or gases may also be used as long as the requirement is met that the working medium can at least partly vaporize and then condense again during the operation of the heat transfer device 1, to hence achieve cooling of the object equipped with the heat transfer device 1.

The heat transport device 1 may be used in particular in the field of industrial and high-performance electronics, such as power semiconductors, converters or frequency converters in the field of electric drive technology, solar inverters and converters for wind power plants, switched-mode power supplies, etc. However, the listed examples of such power electronic components are not to be considered limiting. Rather, the heat transfer device 1 may also be used in other applications, such as for cooling secondary energy storage elements, etc.

The sleeve 2 comprises a first sleeve part 5 and a second sleeve part 6 or consists thereof. The first sleeve part 5 forms in particular the base element of the sleeve 2 and thus the support surface for the vaporization element 4. The second sleeve part 6 forms the covering with which the sleeve 2 is closed.

The sleeve 2 is preferably designed to be dimensionally stable. For this purpose, the sleeve 2 may in particular have an inherent stiffness which enables this dimensional stability. In other words, the sleeve 2 preferably does not consist of films, as is known for example from AT 521 573 A1, although this is possible, in particular if the sleeve 2 is produced from one or multiple metal film(s).

In the preferred embodiment variant, the first sleeve part 5 forms not only the base of the sleeve 2 itself but also the side walls, such that the second sleeve part 6 may be designed as a flat plate. However, it is also possible that both the first sleeve part 5 and the second sleeve part 6 each form a part of the side walls of the sleeve.

Moreover, the first sleeve part 5 and preferably also the second sleeve part 6 consist of a metal material having a thermal conductivity of at least 40 W/(m.K), in particular at least 100 W/(m.K), preferably at least 200 W/(m.K). In particular, the first sleeve part 5 and/or the second sleeve part 6 consists of copper or aluminum, however, may also consist, for example, of stainless steel or brass, etc.

To form the heat transfer device 1, after insertion of the at least one vaporization element 4 and the insertion of the working medium, the two sleeve parts 5, 6 are connected to one another in a pressure-tight manner and the pressure in the interior is reduced (in relation to the ambient pressure of the heat transfer device 1) and/or the interior is evacuated. The pressure-tight connection may be established by connecting the two sleeve parts 5, 6 to one another in a materially bonded manner, for example by welding or soldering. However, bonding connections may also be used and/or formed for this.

The first sleeve part 5 may in particular have a wall thickness 7 of larger than 0.5 mm, for example between 0.6 mm and 5 mm. The second sleeve part 6 may in particular have a wall thickness 8 of larger than 0.5 mm, for example between 0.6 mm and 5 mm.

The at least one vaporization element 4 is designed to be plate-shaped and comprises an in particular plate-shaped holding element 9, on which multiple knob-shaped structural elements 10 are arranged. In this regard, the knob-shaped structural elements 10 project beyond the surface of the holding element 9 in one direction, i.e. for example to the top in the embodiment variant shown in FIG. 1. Preferably, the knob-shaped structural elements 10 project beyond the holding element 9 merely in one direction.

In this context, it should be noted by way of explanation that the knob-shaped structural elements 10 do not have to be knob-shaped in themselves, but that the "knob-shape" is to be seen in interaction with the holding element 9. Thus, the vaporization element 4 as a whole comprises the knobbed shape of the surface.

In the preferred embodiment variant of the invention, the knob-shaped structural elements 10 are designed in one piece with the holding element 9. For this purpose, the at least one vaporization element 4 may in particular be produced according to a powder-metallurgical method or by means of 3D printing.

Figure 2:
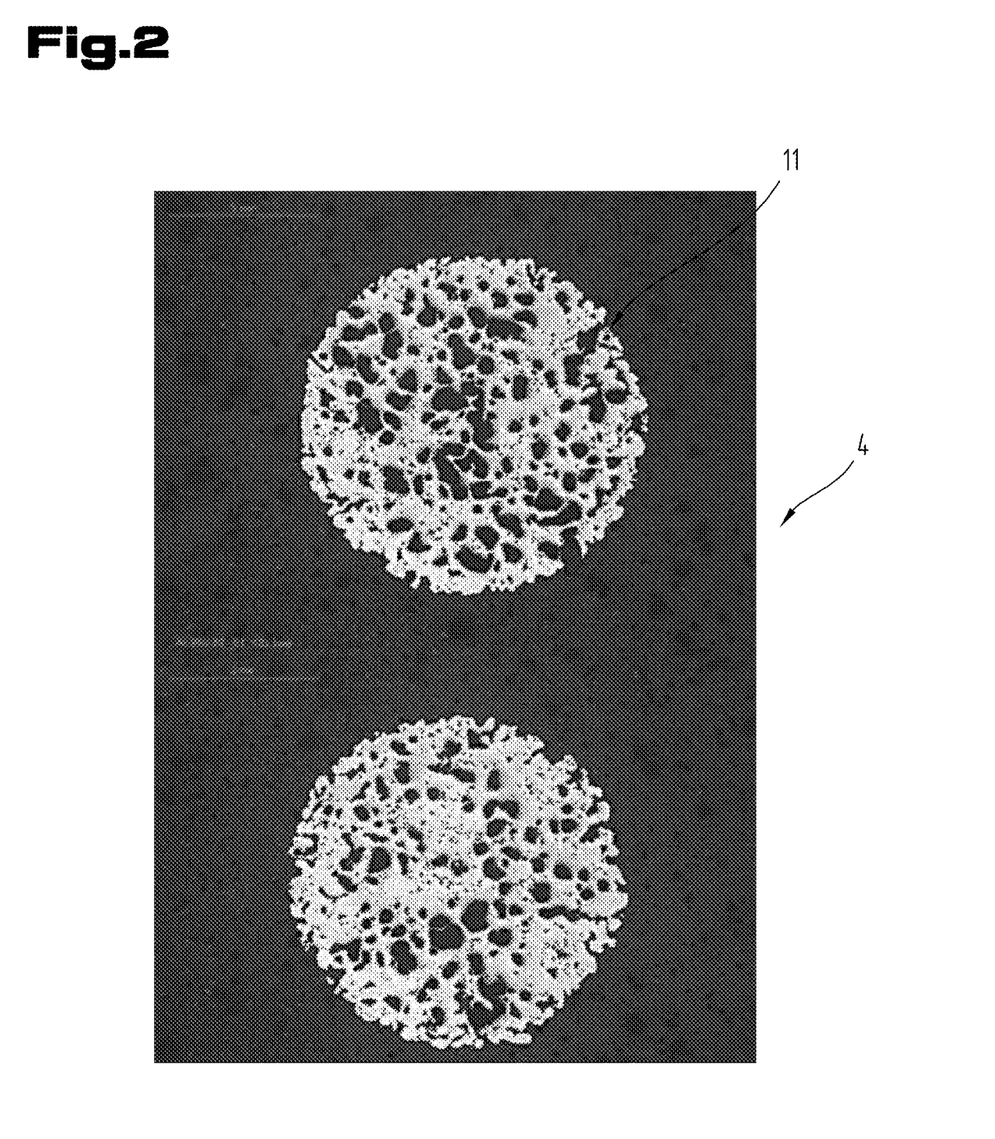
FIG. 2 shows a microscope image of knob-shaped structural elements of a further embodiment variant of the heat transfer device in a top view.
Figure 3:
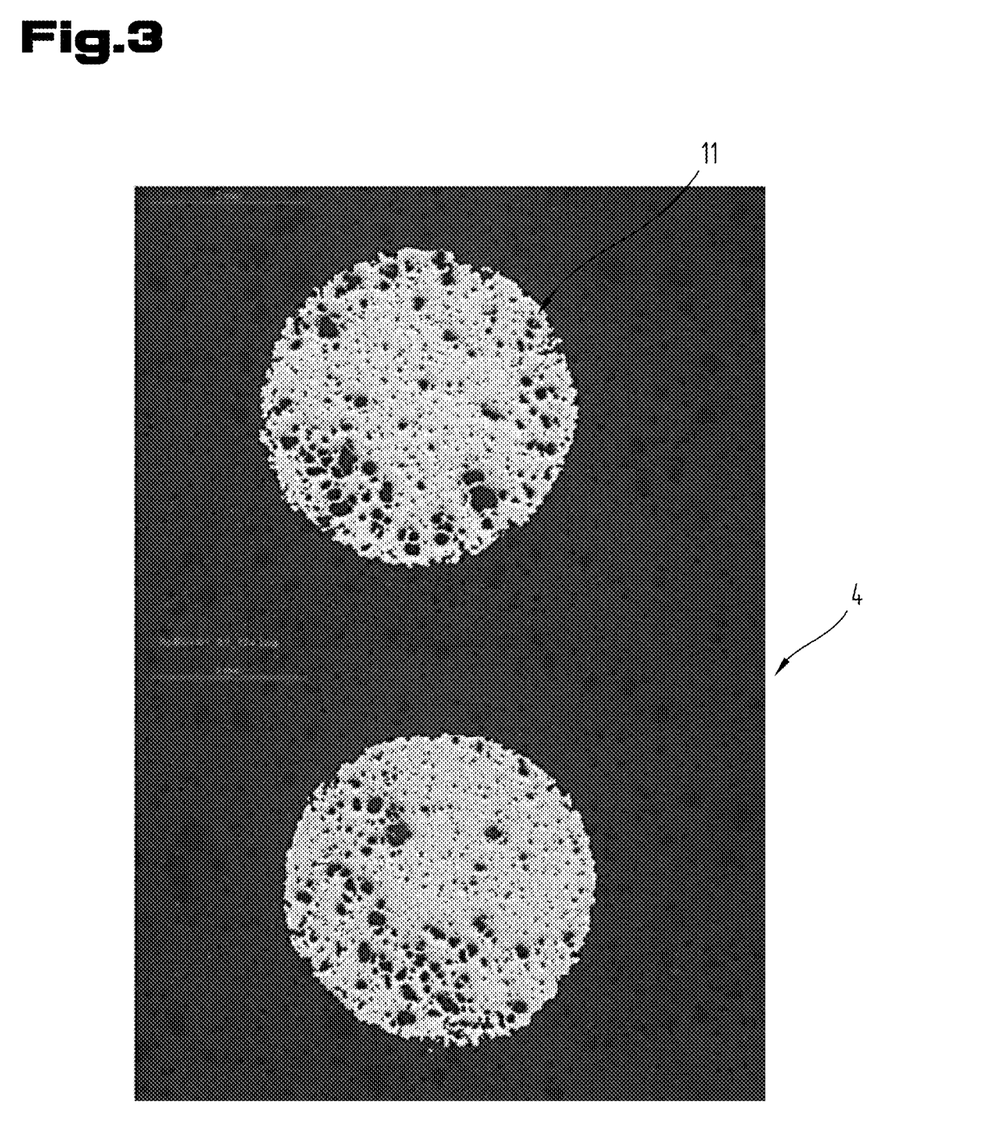
FIG. 3 shows a microscope image of knob-shaped structural elements of another embodiment variant of the heat transfer device in a top view.

The at least one vaporization element 4 is designed having a porosity, meaning that it has pores 11, as may be seen for example in FIGS. 2 and 3. The working medium may enter these pores 11, such that the pores 11 enlarge the available surface of the vaporization element 4.

In general, the porosity of the (knob-shaped) structural elements 10 may amount to between 5%, in particular 10%, and 70%. According to an embodiment variant of the invention, the porosity of the (knob-shaped) structural elements 10 may amount to between 20% and 60%. In this regard, porosity refers to the relation of cavity volume to the overall volume of the structural elements 10. The porosity can be measured, for example, using a porosimeter or by Archimedes' water displacement method.

The holding element 9 is designed to have a porosity at least in some sections. The corresponding statements regarding the porosity of the structural elements 10 may be applied thereto.

It is also possible that the holding element 9 is designed to be pore-free and/or a dense carrier layer, for example consists of an aluminum sheet. Porous knobs may be sintered onto said holding element.

Moreover, it is possible that the heat transfer device 1 does not comprise a holding element 9 but that the structural elements are directly connected to the sleeve 2, for example sintered on or glued on or otherwise connected.

The pores 11 of the porous knob-shaped structural elements 10 (and optionally of the holding element 9) may have a maximum diameter of between 0.5 µm and 50 µm, in particular between 1.5 µm and 45 µm.

In the embodiment variant of the vaporization element 4 shown in FIG. 1, the knob-shaped structural elements 10 are designed to be at least approximately frustoconical, in particular frustoconical. However, these structural elements 10 may also have a different shape, such as a cylindrical shape, a truncated pyramid shape, etc. The structural elements 10 may also be designed as grooves, peens, honeycombs, tubular elements, etc. It is also possible for differently designed structural elements 10 to be arranged within one heat transfer device 1.

Knob-shaped structural elements 10 with a circular cross section may have a maximum diameter 12 which is selected from a range of between 0.4 mm and 75 mm, in particular from a range of between 1 mm and 10 mm. In the case of structural elements 10 having a non-circular but polygonal cross section, the longest lateral edge of the cross section may have a value selected from a range of between 0.5 mm and 50 mm, in particular from a range of between 1 mm and 10 mm.

Moreover, the knob-shaped structural elements 10 may have a height 13 which is selected from a range of between 0.3 mm and 30 mm, in particular from a range of between 1 mm and 10 mm. In this regard, the height 13 is measured from the surface of the holding element 9. The holding element 9 itself may have a thickness 14 in the direction of the height 13, which is selected from a range of between 0.03 mm and 15 mm, in particular from a range of between 0.1 mm and 5 mm.

A minimum distance 15 between directly adjacent structural elements 10 may be selected from a range of between 0.5 mm and 50 mm, in particular from a range of between 1 mm and 10 mm.

The above indications on the geometric dimensions of the knob-shaped structural elements 10 may also be applied to differently designed structural elements 10.

The knob-shaped structural elements 10 may be arranged in rows and columns. However, they can also have a different geometrical arrangement on the holding element 9.

The knob-shaped structural elements 10 also serve, in particular, to form a gas space in the interior 3 of the heat transfer device 1.

The vaporization element 4 may have a rectangular base area. However, other geometries are also possible, for example a square one, a triangular one, etc.

The porous structural elements 10 and/or the porous vaporization element 4 cooperate/cooperates in the fluid transport within the heat transfer device 1. These may act as capillary pumps. For vertical liquid and or heat transfer, the vaporization element 4 is in contact, in particular in direct contact, with the layers of the heat transfer device 1, in particular with the first sleeve part 5, arranged below in each case. For this purpose, it is provided that the vaporization element 4 is connected to the sleeve 2, in particular to the first sleeve part 5. Preferably, the vaporization element 4 and/or the structural elements 10 is/are connected directly (immediately) to the sleeve 2. The connection of the vaporization element 4 may be established via the holding element 9.

The connection between the sleeve 2 and the vaporization element 4 and/or the structural elements 10 may be designed, for example, as a bonding connection or as a materially bonded connection in general. In particular, the at least one vaporization element 4 and/or the structural elements 10 are thermally connected to the sleeve 2. For this purpose, a thermally conductive auxiliary material, such as a solder or a thermally conductive glue, may be used for the materially bonded connection.

According to an embodiment variant of the invention, it may be provided that the vaporization element 4 on its side facing the sleeve 2 comprises a layer 16 with a smaller porosity as compared to the remaining vaporization element 4. In this regard, the porosity may be lower by a value selected from a range of 30% to 100% of the porosity in that region of the vaporization element 4 which has the highest porosity. The layer 16 may thus also be designed to be fully impermeable, whereby an auxiliary material may be used to fill the pores 11 in this layer 16. This auxiliary material preferably has a thermal conductivity of at least 40 W/(m.K), in particular at least 100 W/(m.K). The auxiliary material may thus, for example, be metallic. The lower porosity may also be produced by densification of the layer 16 or by corresponding production with low porosity, for example by means of 3D printing.

Besides the formation of a porosity gradient in the vaporization element with the porosity decreasing in direction towards the connection area between the vaporization element 4 and the sleeve 2, it may generally be provided that, according to an embodiment variant of the invention, the vaporization element 4 and/or the structural elements 10 have section with different porosities. In this regard, the values of the porosities may be selected from the aforementioned ranges for the porosity of the vaporization element 4.

These sections of different porosity may also be produced by partially filling the pores 11 or by compacting the sections after manufacturing the vaporization element 4 or by directly manufacturing with low porosity, for example by means of 3D printing.

The sections of different porosity and/or the layer 16 with lower porosity may also be obtained by using powders with different grain sizes in a sintering (powder metallurgical) manufacturing process. Hence, by the use of a fine-grained powder, a lower porosity may be obtained than by the use of a coarse-grained powder. In this regard, reference is made to FIGS. 2 and 3 which illustrate this using structural elements 10 with different porosities. A coarse-grained powder was used for the manufacture of the vaporization element 4 according to FIG. 2, whereas a fine-grained powder was used for the manufacture of the vaporization element 4 according to FIG. 3. The structural element 10 according to FIG. 2 has a porosity of approx. 45%, whereas the structural element 10 according to FIG. 3 has a porosity of approx. 20%.

According to an embodiment variant of the invention, in particular, a fine-grained powder may be used which comprises particles with a particle size of between 0.5 µm and 100 µm.

According to an embodiment variant of the invention, in particular, a coarse-grained powder may be used which comprises particles with a particle size of between 150 µm and 300 µm.

It is also possible that (these two) powders of different graining are used for the manufacture of a vaporization element 4 and/or the structural elements 10 together.

In general, powders may be used which comprise particles with a grain size of between 0.5 µm and 500 µm.

The sections with different porosities may be formed in one vaporization element 4 being arranged next to one another in the vertical direction and/or in the horizontal direction. For example, in regions in which a high amount of heat is expected, the porosity may be designed having a higher value than in other regions. In regions, where it is not about heat absorption but about heat removal, the porosity may, in contrast, be designed having a lower value in comparison.

However, in the context of the invention, it is not only possible that a single vaporization element 4 is arranged in the interior 3 of the sleeve 2, but it is also possible that multiple vaporization elements 4 (e.g. between two and ten) are arranged next to one another. In this regard, it is also possible that one or multiple vaporization elements 4 have properties differing from the remaining vaporization elements 4, for example a different porosity. However, of course, all vaporization element 4 of one heat transfer device 1 may also be designed equally. The different vaporization elements 4 may also have different heat conductivities or in general consist of different materials.

According to a further embodiment variant of the invention, it may be provided that at least 15%, in particular between 15% and 70%, of this volume of the interior 3 are occupied by the vaporization element 4 or the vaporization elements 4 or the structural elements 10.

Figure 4:
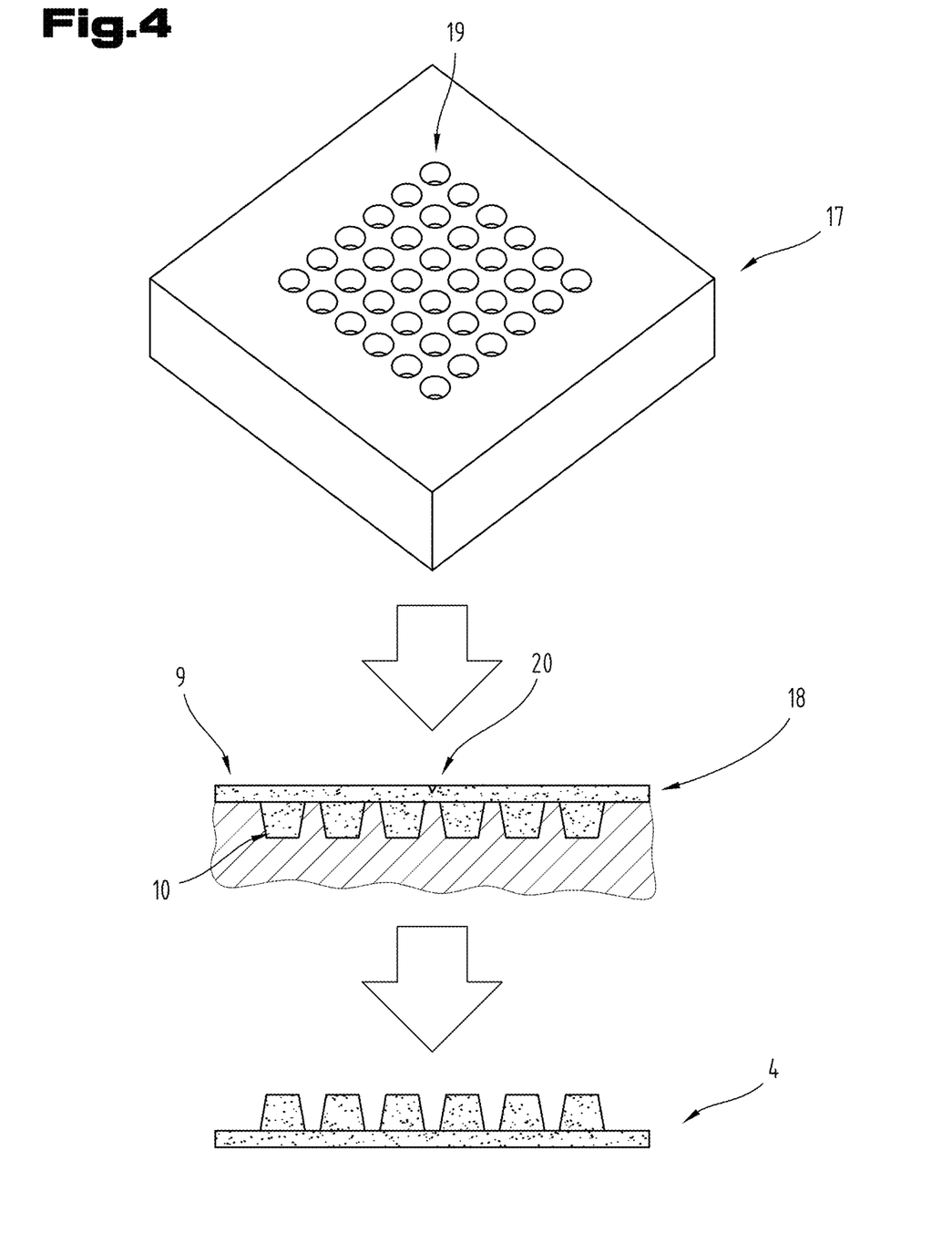
FIG. 4 shows a part of the course of the method for producing a heat transfer device.

FIG. 4 schematically shows the powder-metallurgical production of a vaporization element 4.

Powder-metallurgical methods per se are known from the prior art, such that further explanations in this regard may be dispensed with. It should only be mentioned that these methods comprise the method steps of producing a green compact from a powder, sintering the green compact and optionally post-processing the sintered component.

Also in the method for producing the vaporization element 4, a mold 17 is provided, with the aid of which a (non-pressed) green compact 18 is produced by filling in the powder. The mold 17 has corresponding cavities 19 at the points where the structural elements 10 are to be formed. Furthermore, the mold 17 can have side walls, which are not shown, which project beyond the plane of the cavities 19, such that the holding element 9 can also be formed.

At this point, it should be noted that the term green compact also includes formations in which the green compact 18 is not dimensionally stable in itself. In particular, due to the production of vaporization elements 4 with higher porosities, it may be necessary for the filled-in powder to be sintered unpressed or with a low degree of pressing.

The mold 17 is filled with the powder from which the vaporization element 4 is to be produced. In this regard, preferably both the knob-shaped structural elements 10 and the holding element 9 are formed. In particular, a metal powder is used as the powder. For example, an aluminum base alloy powder may be used which comprises between 0.1 wt. % and 0.4 wt. % copper, between 0.5 wt. % and 2 wt. % magnesium, between 0.4 wt. % and 1 wt. % silicon, and between 0.1 wt. % and 0.4 wt. % iron. The balance adding up to 100 wt. % is formed by aluminum and impurities of the metals caused by production. However, other metal powders may also be used, such as aluminum base alloy powders other than the one mentioned, copper powders, copper base alloy powders (brass, bronze), stainless steel powders, silver powders, gold powders, tin powders, titanium powders, mixtures of the powders mentioned, etc.

Optionally, the green compact 18 is compacted, wherein the compaction does not go so far that the porosity drops below the aforementioned minimum value.

The green compact 18 is sintered, optionally in the mold 17.

The vaporization element 4 is connected to the sleeve 2 to produce the heat transfer device 1, as was already stated above. For this purpose, according to a preferred embodiment variant of the invention, it may be provided that the lower sleeve part 5 is provided being made of a metal material. To form the side walls of the sleeve 2, the first sleeve part 5 may for example be produced from a plane metal sheet by means of deep drawing. The at least one vaporization element 4, in particular with the holding element 9, is placed on said first sleeve part 5. In the preferred embodiment variant, a solder is inserted between the first sleeve part 5 and the vaporization element 4. Subsequently, the second sleeve part 6 is placed on the first sleeve part 5 to form the interior 3 and is connected, in particular in a materially bonded manner, to the lower sleeve part 5 to form the sleeve 2. During this, the vaporization element 4 can also be connected to the lower sleeve part 5 at the same time in the same step. In general, the connection can be established not only in a materially bonded manner, but alternatively or in addition thereto also in a positive locking manner. In particular, the materially bonded connections of the two sleeve parts 5, 6 to one another and of the vaporization element 4 to the lower sleeve part 5 may be established by vacuum brazing.

According to an embodiment variant of the invention, it may be provided that the at least one vaporization element 4 is manufactured with at least one predetermined breaking point. It may, for example, be designed to be groove-shaped, to hence facilitate separation of a part of the vaporization element 4 and thus a size adaption of the heat transfer device 1 to the component to be cooled.

Figure 5:
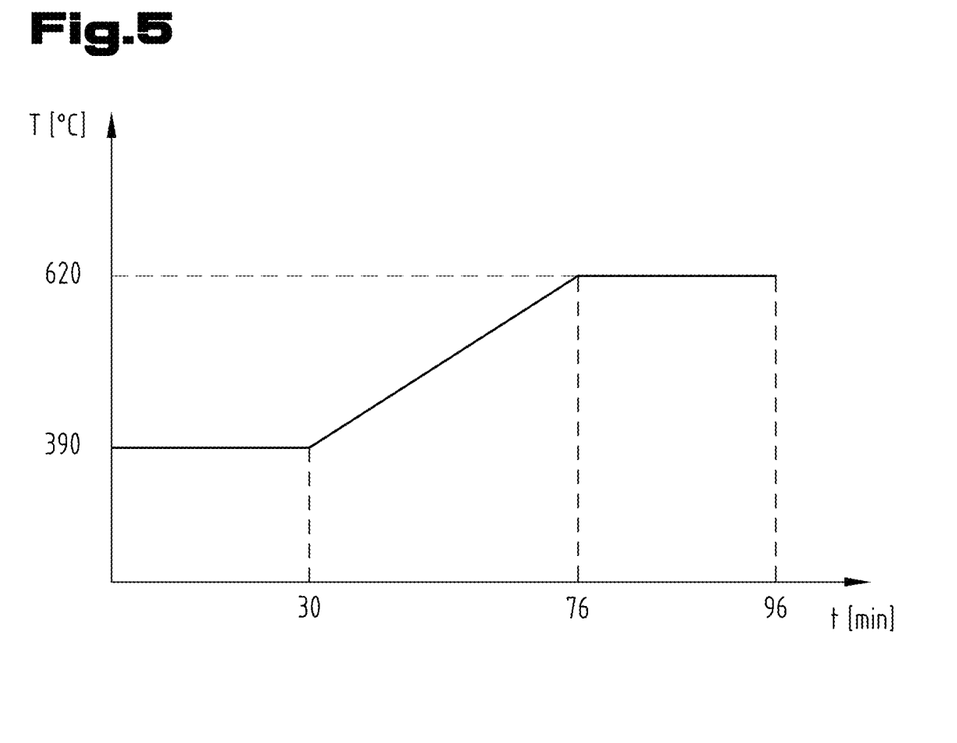
FIG. 5 shows the graphic representation of a temperature profile for producing a heat transfer device according to sintering technology.

FIG. 5 shows an example of the temperature profile during sintering of the green compact 18 to the vaporization element 4 over time. For example, at the beginning, the green compact 18 made of the aforementioned aluminum base alloy powder can be exposed to a temperature of 390° C. for a period of 30 minutes. After this, the temperature can be increased to 620° C. at a rate of 5° C./min and this temperature can be maintained for a period of 20 minutes.

However, other temperature profiles are also possible, in particular if a different metallic powder is sintered. Thus, in general, the sintering process can last between 60 minutes and 240 minutes with the green compact 18 being subjected to a temperature of between 250° C. and 1200° C.

The exemplary embodiments show and/or describe possible embodiment variants, while it should be noted at this point that combinations of the individual embodiment variants are also possible.

Finally, as a matter of form, it should be noted that for ease of understanding of the structure of the heat transfer device 1, it is not obligatorily depicted to scale.

Although only a few embodiments of the present invention have been shown and described, it is to be understood that many changes and modifications may be made thereunto without departing from the spirit and scope of the invention.

LIST OF REFERENCE NUMBERS

1 Heat transfer device
2 Sleeve
3 Interior
4 Vaporization element
5 Sleeve part
6 Sleeve part
7 Wall thickness
8 Wall thickness
9 Holding element
10 Structural elements
11 Pore
12 Diameter
13 Height
14 Thickness
15 Distance
16 Layer
17 Mold
18 Green compact
19 Cavity
20 Predetermined breaking point

What is claimed is:

1. A heat transfer device comprising a sleeve, which forms an interior in which a working medium and one vaporization element having, structural elements, or multiple vaporization elements having, structural elements, for converting at least part of the working medium from the liquid to the gaseous state are contained, wherein the vaporization element or the vaporization elements has or have a porosity, and wherein the vaporization element is connected to the sleeve or the vaporization elements are connected to the sleeve
wherein the vaporization element on a side region of the vaporization element facing the sleeve comprises a layer with a smaller porosity as compared to the remaining region of the vaporization element.

2. The heat transfer device according to claim 1, wherein sections with different porosities are formed in the vaporization element or in the vaporization elements.

3. The heat transfer device according to claim 1, wherein at least the structural elements of the vaporization element or the vaporization elements comprise a porosity of between 5% and 70%.

4. The heat transfer device according to claim 1, wherein the sleeve defines a volume, and wherein at least 15% of the volume is occupied by the vaporization element or the vaporization elements.

5. The heat transfer device according to claim 1, wherein multiple different vaporization elements are arranged in the sleeve.

6. A method for producing a heat transfer device comprising the steps:
providing a sleeve;
providing one vaporization element with knob-shaped structural elements or multiple vaporization elements with knob-shaped structural elements;
filling a liquid into the sleeve; and
pressure-tight closing and reduction of the pressure in the interior of the sleeve;
wherein the vaporization element or the vaporization elements are connected to the sleeve; and
wherein the vaporization element on a side region of the vaporization element facing the sleeve comprises a layer with a smaller porosity as compared to the remaining region of the vaporization element.

7. The method according to claim 6, wherein the vaporization element or the vaporization elements are produced having at least one predetermined breaking point.

8. The method according to claim 6, wherein the vaporization element or the vaporization elements are produced powder-metallurgically or by means of 3D printing.

9. The method according to claim 6, wherein the vaporization element or the vaporization elements is or are made of a powder comprising particles with a grain size of between 5 μm and 500 μm.

* * * * *

UNITED STATES PATENT AND TRADEMARK OFFICE
CERTIFICATE OF CORRECTION

PATENT NO. : 11,598,586 B2
APPLICATION NO. : 17/467606
DATED : March 7, 2023
INVENTOR(S) : Pichler et al.

It is certified that error appears in the above-identified patent and that said Letters Patent is hereby corrected as shown below:

In the Claims

In Claim 1, (Line 52 of Column 9) please delete "," after "having"
In Claim 1, (Line 1 of Column 10) please delete "," after "having"

Signed and Sealed this
Eighteenth Day of April, 2023

Katherine Kelly Vidal
*Director of the United States Patent and Trademark Office*